US009438039B2

(12) United States Patent
Tsai et al.

(10) Patent No.: US 9,438,039 B2
(45) Date of Patent: Sep. 6, 2016

(54) DEMAND RESPONSE DETERMINATION APPARATUS AND METHOD FOR DETERMINING A POWER THRESHOLD USING AN OVER-CONSUMPTION FALSE POSITIVE RATE AND UNLOADING ELECTRIC POWER EQUIPMENT WHEN THE POWER THRESHOLD IS EXCEEDED

(71) Applicant: Institute For Information Industry, Taipei (TW)

(72) Inventors: Gary Tsai, Taipei (TW); Gu-Yuan Lin, New Taipei (TW); Yu-Ting Tsou, Dayuan Township (TW); Jing-Tain Sung, Taipei (TW)

(73) Assignee: Institute For Information Industry, Taipei (TW)

( * ) Notice: Subject to any disclaimer, the term of this patent is extended or adjusted under 35 U.S.C. 154(b) by 696 days.

(21) Appl. No.: 13/746,501

(22) Filed: Jan. 22, 2013

(65) Prior Publication Data

US 2014/0157027 A1    Jun. 5, 2014

(30) Foreign Application Priority Data

Dec. 4, 2012    (TW) .............................. 101145423 A

(51) Int. Cl.
| | |
|---|---|
| G06F 1/32 | (2006.01) |
| G06F 1/26 | (2006.01) |
| H02J 3/14 | (2006.01) |
| G06Q 10/06 | (2012.01) |
| H02J 13/00 | (2006.01) |

(52) U.S. Cl.
CPC ................ *H02J 3/14* (2013.01); *G06Q 10/06* (2013.01); *H02J 13/0062* (2013.01); *Y02B 70/3225* (2013.01); *Y04S 20/222* (2013.01)

(58) Field of Classification Search
CPC .......... H02J 3/14; G06Q 50/06; G04B 15/02
USPC .................................................. 713/323, 300
See application file for complete search history.

(56) References Cited

U.S. PATENT DOCUMENTS

| 7,058,522 B2 | 6/2006 | Chen |
| 7,991,513 B2 | 8/2011 | Pitt |

(Continued)

FOREIGN PATENT DOCUMENTS

TW    201102945 A    1/2011

OTHER PUBLICATIONS

Office Action to the corresponding Taiwan Patent Application rendered by Taiwan Intellectual Property Office (TIPO) on Jun. 4, 2015, 6 pages.

*Primary Examiner* — Robert Cassity
(74) *Attorney, Agent, or Firm* — Skaar Ulbrich Macari, P.A.

(57) ABSTRACT

A demand response determination apparatus and a demand response determination method thereof are provided. The demand response determination apparatus connects to an electric power system via a network. The demand response determination apparatus receives power consumption information from the electric power system and decides a power consumption mode of the electric power system according to the power consumption information. The demand response determination apparatus calculates demanded power according to the power consumption mode and determines whether the demanded power exceeds a power consumption threshold. The demand response determination apparatus informs the electric power system to unload electric power equipment when the demanded power exceeds the power consumption threshold.

12 Claims, 3 Drawing Sheets

(56) References Cited

U.S. PATENT DOCUMENTS

| | | |
|---|---|---|
| 8,046,468 B2 | 10/2011 | Isci et al. |
| 2006/0062363 A1* | 3/2006 | Albrett .................... 379/101.01 |
| 2009/0012653 A1 | 1/2009 | Cheng et al. |
| 2009/0276639 A1* | 11/2009 | Saha et al. .................... 713/300 |
| 2010/0211232 A1 | 8/2010 | Yeh et al. |
| 2011/0153107 A1* | 6/2011 | Kim et al. .................... 700/295 |
| 2011/0184574 A1* | 7/2011 | Le Roux et al. ............. 700/291 |
| 2012/0144219 A1* | 6/2012 | Salahshour et al. .......... 713/322 |

* cited by examiner

DEMAND RESPONSE DETERMINATION APPARATUS AND METHOD FOR DETERMINING A POWER THRESHOLD USING AN OVER-CONSUMPTION FALSE POSITIVE RATE AND UNLOADING ELECTRIC POWER EQUIPMENT WHEN THE POWER THRESHOLD IS EXCEEDED

PRIORITY

This application claims priority to Taiwan Patent Application No. 101145423 filed on Dec. 4, 2012, which is hereby incorporated by reference in its entirety.

FIELD

The present invention relates to a demand response determination apparatus and a demand response determination method thereof. More particularly, the demand response determination apparatus and the demand response determination method thereof of the present invention adopt different power consumption models to determine demanded power depending on different operation modes of an electric power system.

BACKGROUND

A common mode of electric power supply and demand between electric power companies and clients is to sign agreements related to the electric power consumption between the electric power companies and the clients. Such an agreement mainly specifies that, if a total power consumption consumed by a client within a specific time interval (e.g., within fifteen minutes or half an hour) does not exceed an upper limit of power consumption as specified in the agreement, the client can pay the electric bill at a favorable rate. Conversely, if the total power consumption consumed by the client within the specific time interval exceeds the upper limit of power consumption, then the client may have to pay the electric bill at a higher rate.

Accordingly, immense efforts have to be made by the clients to accurately predict the total power consumption within a specific time interval during the power consumption process so that power consumption of electric power equipment can be adjusted in real time by the clients to avoid excessive expenditure caused when the total power consumption exceeds the agreed upper limit.

However, conventional technologies for predicting the total power consumption are mostly developed for specific electric power usage environments. Therefore, when the electric power usage environment of a client changes, the technology originally used for predicting the total power consumption will be unable to change adaptively, which makes the predicted total power consumption significantly different from the actual total power consumption. As a result, a false determination may be made by the client on whether it is necessary to adjust the power consumption mode of the electric power equipment, and this increases the probability of violating the agreement or decreases the utilization factor of the electric power equipment.

Accordingly, an urgent need exists in the art to provide a solution capable of dynamically adjusting the approach of predicting a total power consumption in response to possible changes in power usage environment of the clients so as to remarkably improve accuracy of the predicted total power consumption.

SUMMARY

To solve the aforesaid problem, the present invention provides a demand response determination apparatus and a demand response determination method thereof, which can mainly determine different operation modes of an electric power system dynamically and to adopt different power consumption models to determine demanded power depending on the different operation modes.

To achieve the aforesaid objective, certain embodiments of the present invention provides a demand response determination method for a demand response determination apparatus. The demand response determination apparatus is connected to an electric power system via a network. The demand response determination method comprises the following steps of: (a) enabling the demand response determination apparatus to receive at least one piece of power consumption information from the electric power system; (b) enabling the demand response determination apparatus to decide a power consumption mode of the electric power system according to the at least one piece of power consumption information; (c) enabling the demand response determination apparatus to calculate demanded power according to the power consumption mode; and (d) enabling the demand response determination apparatus to determine whether the demanded power exceeds a power consumption threshold. If the demanded power exceeds the power consumption threshold, then the demand response determination apparatus transmits to the electric power system an over-consumption message which informs the electric power system to unload electric power equipment.

To achieve the aforesaid objective, certain embodiments of the present invention further provides a demand response determination apparatus, which is connected to an electric power system via a network. The demand response determination apparatus comprises a transceiver, a processor and a memory. The transceiver is configured to receive at least one piece of power consumption information from the electric power system. The processor is configured to decide a power consumption mode of the electric power system according to the at least one piece of power consumption information and calculate demanded power according to the power consumption mode. The processor is further configured to determine whether the demanded power exceeds a power consumption threshold stored in the memory. If the demanded power exceeds the power consumption threshold, then the processor further transmits an over-consumption message, which informs the electric power system to unload electric power equipment, to the electric power system via the transceiver.

Through the aforesaid technical features disclosed above, the demand response determination apparatus and the demand response determination method thereof according to the present invention can dynamically adjust the approach of predicting the total power consumption in response to changes in power usage environment of the electric power system and accomplish prediction of the total power consumption more accurately and efficiently.

The detailed technology and preferred embodiments implemented for the subject invention are described in the following paragraphs accompanying the appended drawings for people skilled in this field to well appreciate the features of the claimed invention.

DETAILED DESCRIPTION

In the following descriptions, the present invention will be explained with reference to example embodiments thereof. However, these example embodiments are not intended to limit the present invention to any specific examples, embodiments, environments, applications or implementations described in these embodiments. Therefore, description of these embodiments is only for purpose of illustration rather than to limit the present invention. It shall be appreciated that, in the following embodiments and the attached drawings, elements not directly related to the present invention are omitted from depiction.

Figure 1A:
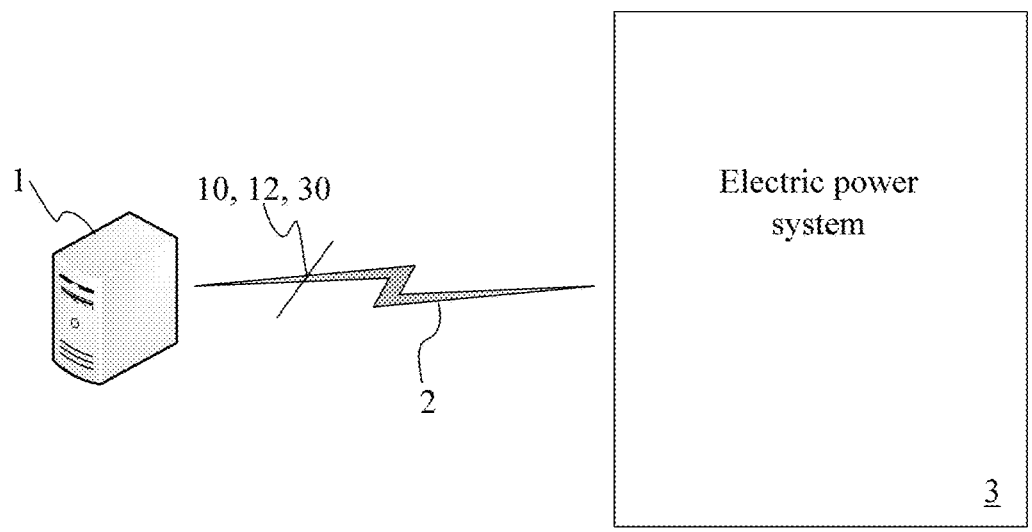
FIG. 1A is a schematic view illustrating connection between a demand response determination apparatus and an electric power system according to a first embodiment of the present invention.
Figure 1B:
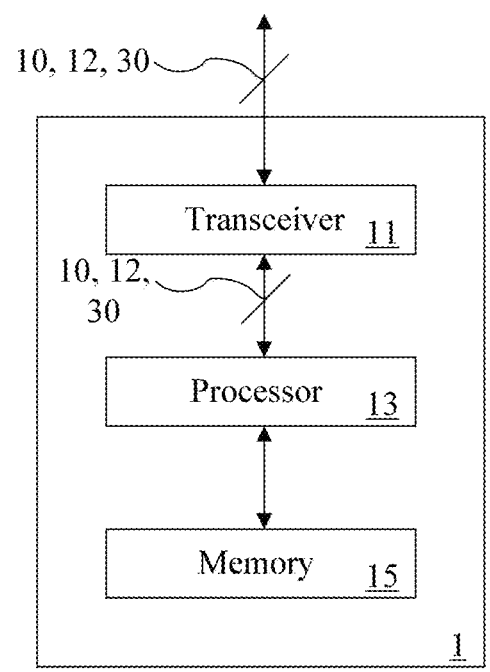
FIG. 1B is a schematic view illustrating the demand response determination apparatus according to the first embodiment of the present invention.

Referring to FIG. 1A and FIG. 1B. FIG. 1A is a schematic view illustrating connection between a demand response determination apparatus 1 and an electric power system 3 according to a first embodiment of the present invention. The demand response determination apparatus 1 is connected to the electric power system 3 via a network 2. FIG. 1B is a schematic view illustrating the demand response determination apparatus 1 according to the first embodiment of the present invention. The demand response determination apparatus 1 comprises a transceiver 11, a processor 13 and a memory 15.

It shall be particularly appreciated that, as can be readily devised by people skilled in the art, the electric power system 3 of the first embodiment is a common electric power system comprising components such as a general electric power equipment loop and smart meters having the communication function; and particularly, the electric power system 3 of the first embodiment can transmit information related to electric power to the demand response determination apparatus 1 of the present invention via a network so that the information can be further analyzed by the demand response determination apparatus 1. Accordingly, the subsequent description will focus on how the demand response determination apparatus 1 analyzes power consumption information, and the components of the electric power system 3 will not be further described herein. Interactions between the network components of the first embodiment will be further elucidated in the following description.

Firstly, the transceiver 11 of the demand response determination apparatus 1 receives at least one piece of power consumption information 30 from the electric power system 3. The at least one piece of power consumption information 30 may comprise related information such as a power consumption per time unit, a total power consumption or a power consumption time period. Accordingly, the processor 13 of the demand response determination apparatus 1 can decide a power consumption mode (not shown) (e.g., a time periodic power consumption mode or a power consumption correlation mode) of the electric power system 3 according to the at least one piece of power consumption information 30.

Then, after deciding the power consumption mode of the electric power system 3, the processor 13 of the demand response determination apparatus 1 can calculate demanded power (not shown), which may be consumed by the electric power system 3 subsequently, in advance according to the power consumption mode. Then, the processor 13 of the demand response determination apparatus 1 determines whether the demanded power exceeds a power consumption threshold (not shown) (e.g., an upper limit of power consumption specified by a client and an electric power company) stored in the memory 15.

If the processor 13 of the demand response determination apparatus 1 determines that the demanded power exceeds the power consumption threshold, it represents that the total power consumption that may be generated by the electric power system 3 subsequently will exceed the upper limit of power consumption. Then, the processor 13 of the demand response determination apparatus 1 transmits an over-consumption message 10, which informs the electric power system 3 to unload secondary electric power equipment, to the electric power system 3 via the transceiver 11. Thereby, the total power consumption that may be generated by the electric power system 3 subsequently is prevented from exceeding the upper limit of power consumption.

On the other hand, if the processor 13 of the demand response determination apparatus 1 determines that the demanded power does not exceed the power consumption threshold, it represents that there still exists redundant electric power that can be used by the electric power system 3. Then, the processor 13 of the demand response determination apparatus 1 can transmit a non-over-consumption message 12, which informs the electric power system 3 to load the electric power equipment that is unloaded previously or has not been used, to the electric power system 3 via the transceiver 11 so as to improve the operation efficiency of the electric power system 3.

It shall be particularly appreciated that, although there still exists redundant electric power that can be used by the electric power system 3 when the processor 13 of the demand response determination apparatus 1 determines that the demanded power does not exceed the power consumption threshold, the electric power system 3 will not load any electric power equipment if there is no proper electric power equipment to be loaded (e.g., electric power equipment after being loaded still makes the demanded power exceed the power consumption threshold). In brief, when the demanded power exceeds the power consumption threshold, the electric power system 3 will unload equipment; however, when the demanded power does not exceed the power consumption threshold, the electric power system 3 will not necessarily load equipment.

Hereinbelow, three power consumption modes that are possibly adopted by the electric power system will be further described. Firstly, if the at least one piece of power consumption information 30 comprises a power consumption period and the power consumption period shows that the power consumption conditions of the electric power system 3 are circulated periodically (e.g., the power consumption is higher at noon 12:00 and is lower at night 12:00 every day), then the demand response determination apparatus 1 can decide that the power consumption mode of the electric power system 3 is a periodic power consumption mode according to the power consumption period comprised in the at least one piece of power consumption information 30. Accordingly, the processor 13 of the demand response determination apparatus 1 can decide a power consumption period model of the electric power system 3 according to the periodic power consumption mode, and predictively calculate the demanded power according to the power consumption period model.

Secondly, if the at least one piece of power consumption information comprises a first total power consumption and a second total power consumption which are correlated with each other (e.g., there is a fixed difference between the first total power consumption measured at a specific time point and the second total power consumption measured at a next time point), then the demand response determination apparatus 1 can decide the power consumption mode of the electric power system 3 to be a total power consumption correlation mode according to the first total power consumption and the second total power consumption comprised in the at least one piece of power consumption information. Accordingly, the processor 13 of the demand response determination apparatus 1 can decide a total power consumption correlation model of the electric power system 3 according to the total power consumption correlation mode, and calculate the demanded power according to the total power consumption correlation model.

Thirdly, if the at least one piece of power consumption information comprises a first total power consumption, a second total power consumption and a third total power consumption which have regression relationships therebetween, then the demand response determination apparatus 1 can decide the power consumption mode of the electric power system 3 to be a regression power consumption mode according to the first total power consumption, the second total power consumption and the third total power consumption comprised in the at least one piece of power consumption information. Accordingly, the processor 13 of the demand response determination apparatus 1 can decide a regression model of the electric power system 3 according to the regression power consumption mode, and calculate the demanded power (e.g., through support vector regression) according to the regression model.

Additionally, it shall be particularly emphasized that, in order to improve the accuracy of the predicted demanded power when the regression model of the electric power system 3 used for calculating the demanded power adopts a support vector regression mode, the present invention can further introduce a principal components analysis (PCA) mode to facilitate analysis on the power consumption conditions of the electric power system 3. It shall be firstly appreciated that, the PCA mode is known in the prior art, so the contents of the PCA mode will not be further described herein. In detail, if the regression model adopts the support vector regression mode, then the processor 13 of the demand response determination apparatus 1 can further analyze an equipment power consumption status of the first total power consumption, an equipment power consumption status of the second total power consumption and an equipment power consumption status of the third total power consumption by means of the PCA mode, and decide the regression power consumption mode of the electric power system 3 accordingly. Thus, the determination result of the power consumption mode becomes more accurate.

More specifically, if power consumption detection hardware is installed in different pieces of equipment of the electric power system respectively, then the at least one piece of power consumption information comprises a power consumption status of each of the pieces of equipment. Accordingly, the processor 13 of the demand response determination apparatus 1 can analyze an equipment power consumption status of the first total power consumption, an equipment power consumption status of the second total power consumption and an equipment power consumption status of the third total power consumption by means of the PCA mode and according to the at least one piece of power consumption information so as to obtain power consumption levels of the pieces of equipment of the electric power system 3. Thus, the processor 13 of the demand response determination apparatus 1 can obtain further power consumption conditions of the electric power system 3 by means of the PCA mode, so the processor 13 of the demand response determination apparatus 1 can obtain a more accurate result when determining the regression power consumption mode of the electric power system 3 according to the equipment power consumption statuses comprised in the at least one piece of power consumption information 30.

It shall be particularly appreciated that, the demand response determination apparatus 1 can determine the power consumption mode of the electric power system 3 by using the aforesaid three approaches simultaneously, and will select the mode with the maximum conformity as the basis for calculating a model. Deciding the model according to power consumption time points in the periodic power consumption mode, deciding the model according to the total power consumption in the correlation mode or deciding the model according to regression relationships between power consumptions in the regression mode can be readily appreciated by people skilled in the art based on the disclosure of the present invention, and thus will not be further described herein.

Further, the demanded power is predictively calculated in the present invention. Therefore, the demanded power calculated by the demand response determination apparatus cannot completely conform to the actual power consumption, so the demanded power obtained through calculation has corresponding false positive rates with respect to specific thresholds. However, too high or too low false positive rates will lead to a reduced overall usage efficiency of the electric power system. Accordingly, the present invention also further deals with setting of power consumption thresholds so as to balance false positive rates.

Specifically, the memory 15 of the demand response determination apparatus 1 is further configured to store a plurality of preset electric power thresholds (not shown), and the processor 13 of the demand response determination apparatus 1 can determine a plurality of over-consumption false positive rates (not shown) corresponding to the preset electric power thresholds according to the demanded power calculated based on the power consumption mode. Then, the processor 13 of the demand response determination apparatus 1 decides at least one first over-consumption false positive rate from the plurality of over-consumption false positive rates. The selection criterion is that the at least one first over-consumption false positive rate must be smaller than a preset over-consumption false positive rate (i.e., a false positive rate that can be accepted by the client).

Then, the processor 13 of the demand response determination apparatus 1 further determines that a maximum rate of the at least one first over-consumption false positive rate is a second over-consumption false positive rate. Finally, because each of the false positive rates has a corresponding threshold, the processor 13 of the demand response determination apparatus 1 can reversely determine a primary electric power threshold corresponding to the second over-consumption false positive rate, and designate the primary electric power threshold as the power consumption threshold.

Figure 2:
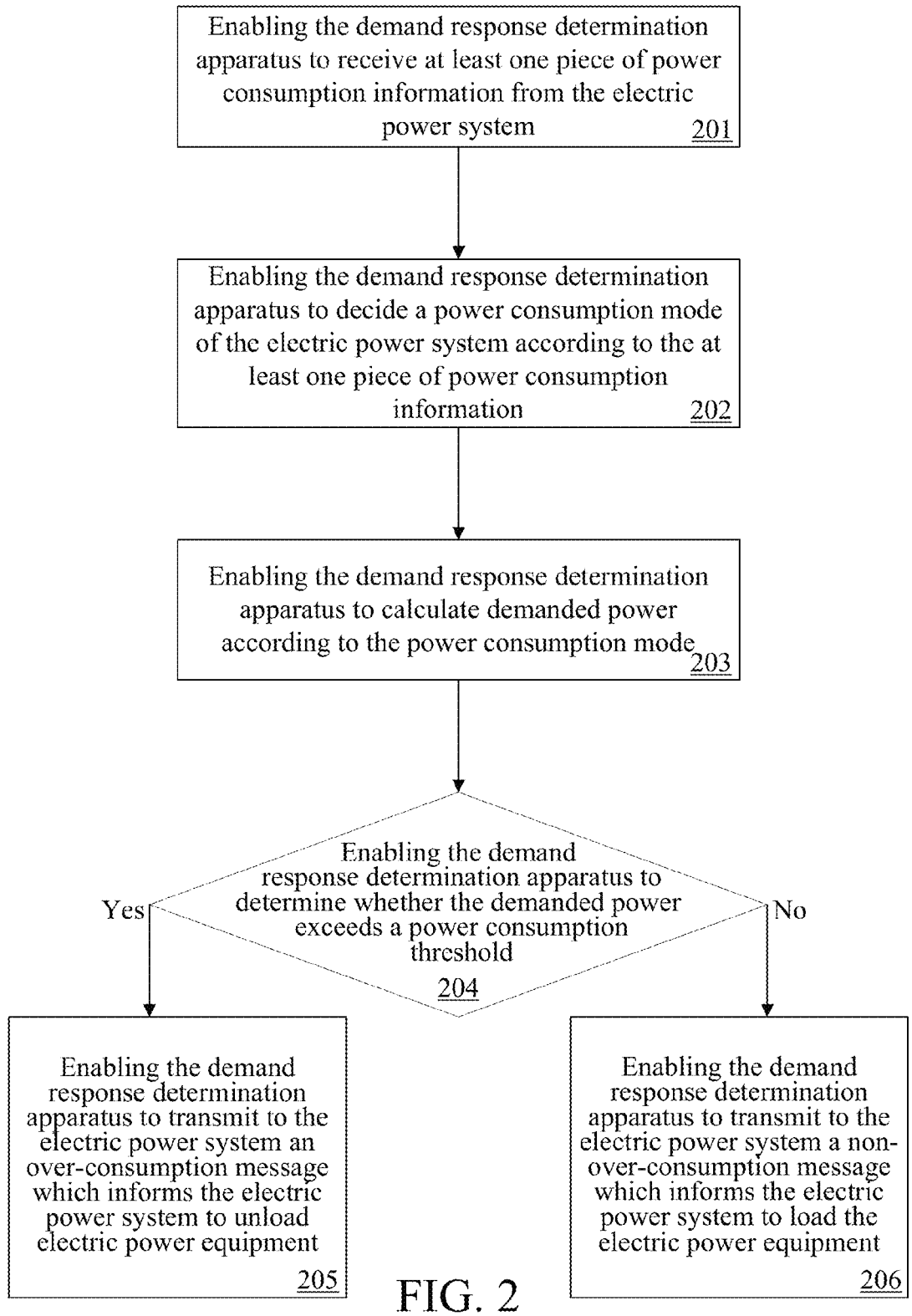
FIG. 2 is a flowchart diagram of a demand response determination method according to a second embodiment of the present invention.

A second embodiment of the present invention is a demand response determination method, a flowchart diagram of which is shown in FIG. 2. The demand response determination method of the second embodiment is for use in a demand response determination apparatus (e.g., the demand response determination apparatus 1 of the aforesaid embodiment). The demand response determination apparatus is connected to an electric power system via a network. Detailed steps of the second embodiment are as follows.

Firstly, step 201 is executed to enable the demand response determination apparatus to receive at least one piece of power consumption information from the electric power system. Then, step 202 is executed to enable the demand response determination apparatus to decide a power consumption mode of the electric power system according to the at least one piece of power consumption information. Step 203 is executed to enable the demand response determination apparatus to calculate demanded power according to the power consumption mode.

Finally, step 204 is executed to enable the demand response determination apparatus to determine whether the demanded power exceeds a power consumption threshold. If the demanded power exceeds the power consumption threshold, then step 205 is executed to enable the demand response determination apparatus to transmit to the electric power system an over-consumption message which informs the electric power system to unload electric power equipment. Conversely, if the demanded power does not exceed the power consumption threshold, then step 206 is executed to enable the demand response determination apparatus to transmit to the electric power system a non-over-consumption message which informs the electric power system to load the electric power equipment.

Likewise, the demand response determination method of the present invention can also further determine power consumption modes, which are possibly adopted by the electric power system, in the step 202 and the step 203 in three ways. Firstly, if, in the step 202, the at least one piece of power consumption information comprises a power consumption period and the power consumption period shows that the power consumption conditions of the electric power system are circulated periodically, then the demand response determination apparatus can decide that the power consumption mode of the electric power system is a periodic power consumption mode according to the power consumption period comprised in the at least one piece of power consumption information. Accordingly, in the step 203, the demand response determination apparatus can decide a power consumption period model of the electric power system according to the periodic power consumption mode and predictively calculate the demanded power according to the power consumption period model.

Secondly, if, in the step 202, the at least one piece of power consumption information comprises a first total power consumption and a second total power consumption which are correlated with each other, then the demand response determination apparatus can decide the power consumption mode of the electric power system to be a total power consumption correlation mode according to the first total power consumption and the second total power consumption comprised in the at least one piece of power consumption information. Accordingly, in the step 203, the demand response determination apparatus can decide a total power consumption correlation model of the electric power system according to the total power consumption correlation mode and calculate the demanded power according to the total power consumption correlation model.

Thirdly, if, in the step 202, the at least one piece of power consumption information comprises a first total power consumption, a second total power consumption and a third total power consumption which have regression relationships therebetween, then the demand response determination apparatus can decide the power consumption mode of the electric power system to be a regression power consumption mode according to the first total power consumption, the second total power consumption and the third total power consumption comprised in the at least one piece of power consumption information. Accordingly, in the step 203, the demand response determination apparatus can decide a regression model of the electric power system according to the regression power consumption mode and calculate the demanded power according to the regression model.

On the other hand, in order to improve the accuracy of the predicted demanded power, the demand response determination method of the present invention can also introduce a PCA mode to facilitate analysis on the power consumption conditions of the electric power system. In detail, the demand response determination apparatus can further analyze an equipment power consumption status of the first total power consumption, an equipment power consumption status of the second total power consumption and an equipment power consumption status of the third total power consumption by means of the PCA mode and according to the at least one piece of power consumption information in the step 201, and decide the power consumption mode of the electric power system to be the regression power consumption mode according to the equipment power consumption status of the first total power consumption, the equipment power consumption status of the second total power consumption and the equipment power consumption status of the third total power consumption in the step 202. The regression power consumption mode is a support vector regression mode. Thus, the determination result of the power consumption mode becomes more accurate.

Figure 3:
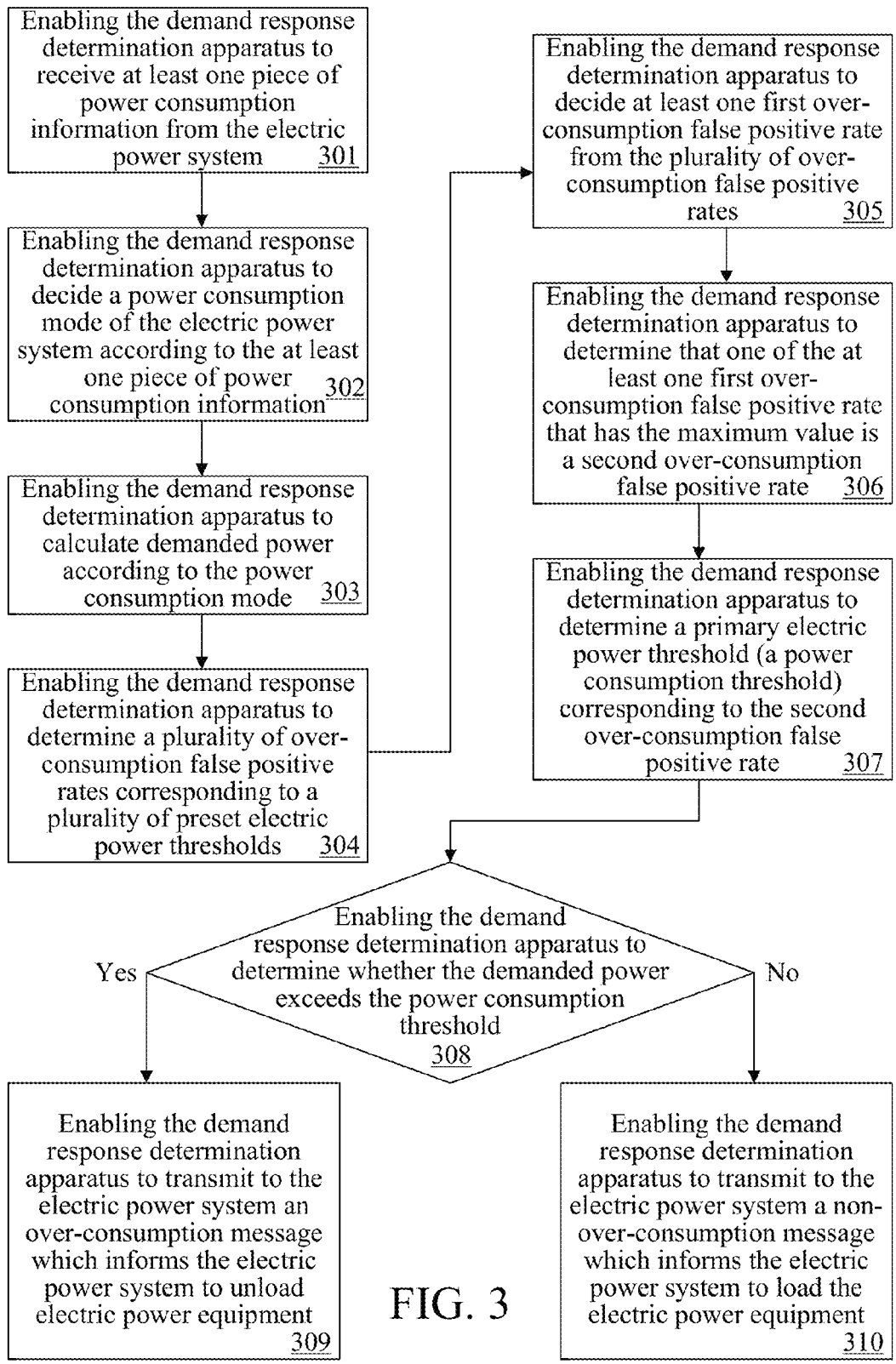
FIG. 3 is a flowchart diagram of a demand response determination method according to a third embodiment of the present invention.

A third embodiment of the present invention is a demand response determination method, a flowchart diagram of which is shown in FIG. 3. The demand response determination method of the third embodiment is for use in a demand response determination apparatus (e.g., the demand response determination apparatus 1 of the aforesaid embodiment). The demand response determination apparatus is connected to an electric power system via a network. Detailed steps of the third embodiment are as follows.

Firstly, step 301 is executed to enable the demand response determination apparatus to receive at least one piece of power consumption information from the electric power system. Then, step 302 is executed to enable the demand response determination apparatus to decide a power consumption mode of the electric power system according to the at least one piece of power consumption information. Step 303 is executed to enable the demand response determination apparatus to calculate demanded power according to the power consumption mode.

Then, step 304 is executed to enable the demand response determination apparatus to determine a plurality of over-consumption false positive rates corresponding to a plurality of preset electric power thresholds according to the demanded power calculated based on the power consumption mode. Step 305 is executed to enable the demand response determination apparatus to decide at least one first over-consumption false positive rate from the plurality of over-consumption false positive rates. The at least one first over-consumption false positive rate is smaller than a preset over-consumption false positive rate.

Then, step 306 is executed to enable the demand response determination apparatus to determine that a maximum rate of the at least one first over-consumption false positive rate is a second over-consumption false positive rate. Step 307 is executed to enable the demand response determination apparatus to determine a primary electric power threshold corresponding to the second over-consumption false positive rate. The primary electric power threshold is the power consumption threshold.

Finally, step 308 is executed to enable the demand response determination apparatus to determine whether the demanded power exceeds a power consumption threshold. If the demanded power exceeds the power consumption threshold, then step 309 is executed to enable the demand response determination apparatus to transmit to the electric power system an over-consumption message which informs the electric power system to unload electric power equipment. Conversely, if the demanded power does not exceed the power consumption threshold, then step 310 is executed to enable the demand response determination apparatus to transmit to the electric power system a non-over-consumption message which informs the electric power system to load the electric power equipment.

According to the above descriptions, the demand response determination apparatus and the demand response determination method thereof of the present invention can dynamically determine power consumption modes of an electric power system and calculate demanded power of the electric power system depending on the different power consumption modes; and this way is more accurate and more efficient.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A demand response determination method for a demand response determination apparatus, the demand response determination apparatus being connected to an electric power system via a network, the demand response determination method comprising the steps of:
   (a) enabling the demand response determination apparatus to receive at least one piece of power consumption information from the electric power system;
   (b) enabling the demand response determination apparatus to decide a power consumption mode of the electric power system according to the at least one piece of power consumption information;
   (c) enabling the demand response determination apparatus to calculate a demanded power according to the power consumption mode;
   (d1) enabling the demand response determination apparatus to determine a plurality of over-consumption false positive rates corresponding to a plurality of preset electric power thresholds according to the demanded power calculated based on the power consumption mode;
   (d2) enabling the demand response determination apparatus to decide at least one first over-consumption false positive rate from the plurality of over-consumption false positive rates, wherein the at least one first over-consumption false positive rate is smaller than a preset over-consumption false positive rate;
   (d3) enabling the demand response determination apparatus to determine that a maximum rate of the at least one first over-consumption false positive rate is a second over-consumption false positive rate;
   (d4) enabling the demand response determination apparatus to determine a primary electric power threshold corresponding to the second over-consumption false positive rate, wherein the primary electric power threshold is a power consumption threshold; and
   (d5) enabling the demand response determination apparatus to determine whether the demanded power exceeds the power consumption threshold, wherein if the demanded power exceeds the power consumption threshold, then the demand response determination apparatus transmits to the electric power system an over-consumption message which informs the electric power system to unload electric power equipment.

2. The demand response determination method as claimed in claim 1, wherein the step (d5) further comprises the step of:
   (d51) enabling the demand response determination apparatus to determine whether the demanded power exceeds the power consumption threshold, wherein if the demanded power does not exceed the power consumption threshold, the demand response determination apparatus transmits to the electric power system a non-over-consumption message which informs the electric power system to load the electric power equipment.

3. The demand response determination method as claimed in claim 1, wherein the at least one piece of power consumption information comprises a power consumption period, and the step (b) further comprises the step of:
   (b1) enabling the demand response determination apparatus to decide that the power consumption mode of the electric power system is a periodic power consumption mode according to the power consumption period comprised in the at least one piece of power consumption information;
   wherein the step (c) further comprises the following steps of:
   (c1) enabling the demand response determination apparatus to decide a power consumption period model of the electric power system according to the periodic power consumption mode; and
   (c2) enabling the demand response determination apparatus to calculate the demanded power according to the power consumption period model.

4. The demand response determination method as claimed in claim 1, wherein the at least one piece of power consumption information comprises a first total power consumption and a second total power consumption, and the step (b) further comprises the step of:
   (b1) enabling the demand response determination apparatus to decide the power consumption mode of the electric power system to be a total power consumption correlation mode according to the first total power consumption and the second total power consumption;
   wherein the step (c) further comprises the following steps of:
   (c1) enabling the demand response determination apparatus to decide a total power consumption correlation model of the electric power system according to the total power consumption correlation mode; and
   (c2) enabling the demand response determination apparatus to calculate the demanded power according to the total power consumption correlation model.

5. The demand response determination method as claimed in claim 1, wherein the at least one piece of power consumption information comprises a first total power consumption, a second total power consumption and a third total power consumption, and the step (b) further comprises the step of:
- (b1) enabling the demand response determination apparatus to decide the power consumption mode of the electric power system to be a regression power consumption mode according to the first total power consumption, the second total power consumption and the third total power consumption;

wherein the step (c) further comprises the following steps of:
- (c1) enabling the demand response determination apparatus to decide a power consumption regression model of the electric power system according to the regression power consumption mode; and
- (c2) enabling the demand response determination apparatus to calculate the demanded power according to the power consumption regression model.

6. The demand response determination method as claimed in claim 5, wherein the step (a) further comprises the step of:
- (a1) enabling the demand response determination apparatus to analyze an equipment power consumption status of the first total power consumption, an equipment power consumption status of the second total power consumption and an equipment power consumption status of the third total power consumption by means of a principal components analysis (PCA) mode and according to the at least one piece of power consumption information;

wherein the step (b1) further comprises the following step of:
- (b2) enabling the demand response determination apparatus to decide the power consumption mode of the electric power system to be the regression power consumption mode according to the equipment power consumption status of the first total power consumption, the equipment power consumption status of the second total power consumption and the equipment power consumption status of the third total power consumption, wherein the regression power consumption mode is a support vector regression mode.

7. A demand response determination apparatus, being connected to an electric power system via a network, the demand response determination apparatus comprising:
- a memory, being configured to store a power consumption threshold and a plurality of preset electric power thresholds;
- a transceiver, being configured to receive at least one piece of power consumption information from the electric power system; and
- a processor, being configured to decide a power consumption mode of the electric power system according to the at least one piece of power consumption information and calculate a demanded power according to the power consumption mode;

wherein the processor is further configured to:
- determine a plurality of over-consumption false positive rates corresponding to the preset electric power thresholds according to the demanded power calculated based on the power consumption mode;
- decide at least one first over-consumption false positive rate from the plurality of over-consumption false positive rates which is smaller than a preset over-consumption false positive rate;
- determine that a maximum rate of the at least one first over-consumption false positive rate is a second over-consumption false positive rate;
- determine a primary electric power threshold corresponding to the second over-consumption false positive rate, wherein the primary electric power threshold is the power consumption threshold; and
- determine whether the demanded power exceeds the power consumption threshold, and if the demanded power exceeds the power consumption threshold, then the processor further transmits an over-consumption message, which informs the electric power system to unload electric power equipment, to the electric power system via the transceiver.

8. The demand response determination apparatus as claimed in claim 7, wherein the processor is further configured to determine whether the demanded power exceeds the power consumption threshold, and if the demanded power does not exceed the power consumption threshold, the demand response determination apparatus transmits to the electric power system a non-over-consumption message which informs the electric power system to load the electric power equipment.

9. The demand response determination apparatus as claimed in claim 7, wherein the at least one piece of power consumption information comprises a power consumption period, and the processor is further configured to: decide that the power consumption mode of the electric power system is a periodic power consumption mode according to the power consumption period comprised in the at least one piece of power consumption information, decide a power consumption period model of the electric power system according to the periodic power consumption mode, and calculate the demanded power according to the power consumption period model.

10. The demand response determination apparatus as claimed in claim 7, wherein the at least one piece of power consumption information comprises a first total power consumption and a second total power consumption, and the processor is further configured to: decide the power consumption mode of the electric power system to be a total power consumption correlation mode according to the first total power consumption and the second total power consumption, decide a total power consumption correlation model of the electric power system according to the total power consumption correlation mode, and calculate the demanded power according to the total power consumption correlation model.

11. The demand response determination apparatus as claimed in claim 7, wherein the at least one piece of power consumption information comprises a first total power consumption, a second total power consumption and a third total power consumption, and the processor is further configured to: decide the power consumption mode of the electric power system to be a regression power consumption mode according to the first total power consumption, the second total power consumption and the third total power consumption, decide a power consumption regression model of the electric power system according to the regression power consumption mode, and calculate the demanded power according to the power consumption regression model.

12. The demand response determination apparatus as claimed in claim 11, wherein the processor is further configured to analyze an equipment power consumption status of the first total power consumption, an equipment power consumption status of the second total power consumption and an equipment power consumption status of the third total power consumption by means of a principal components analysis (PCA) mode, and to decide the power consumption mode of the electric power system to be the regression power consumption mode according to the equipment power consumption status of the first total power consumption, the equipment power consumption status of the second total power consumption and the equipment power consumption status of the third total power consumption, and the regression power consumption mode is a support vector regression mode.

\* \* \* \* \*